Figure 5:
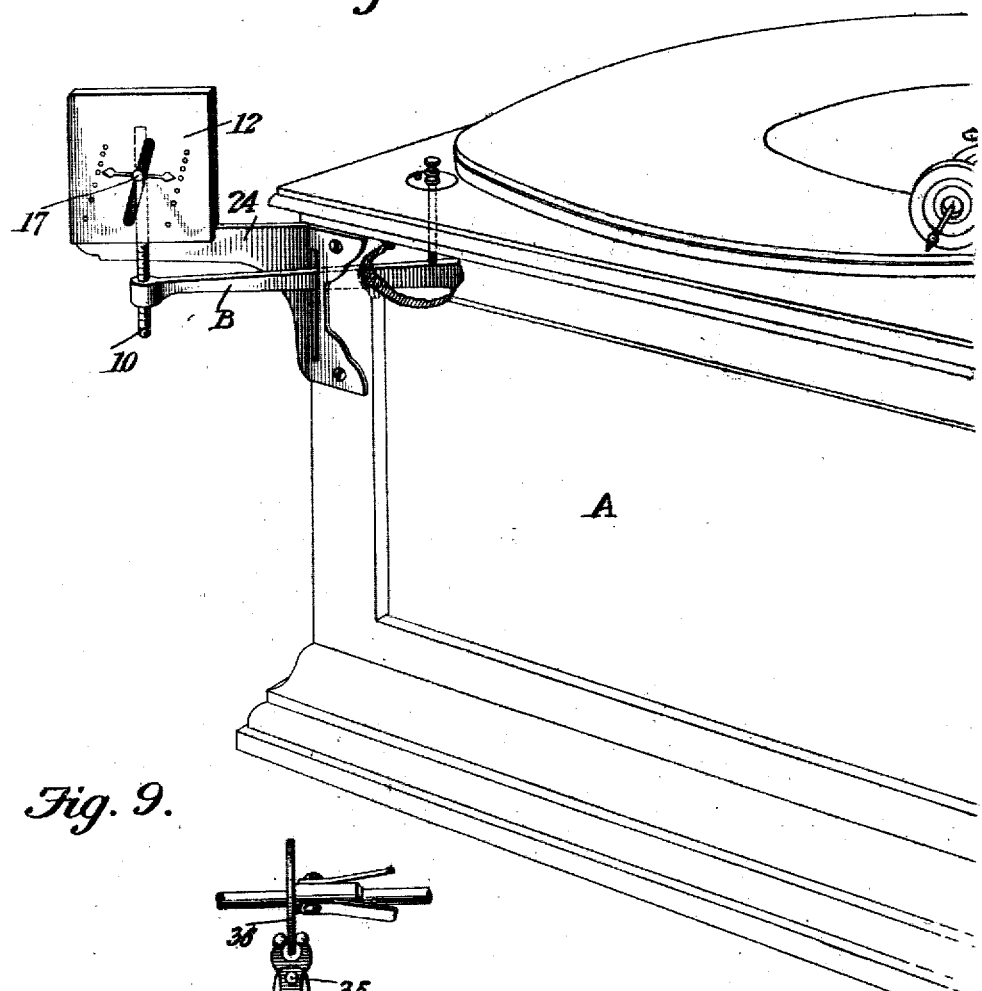

No. 814,941. PATENTED MAR. 13, 1906.
C. L. CHISHOLM.
PITCH INDICATING ATTACHMENT FOR SOUND REPRODUCING MACHINES.
APPLICATION FILED AUG. 8, 1905.
5 SHEETS—SHEET 1.
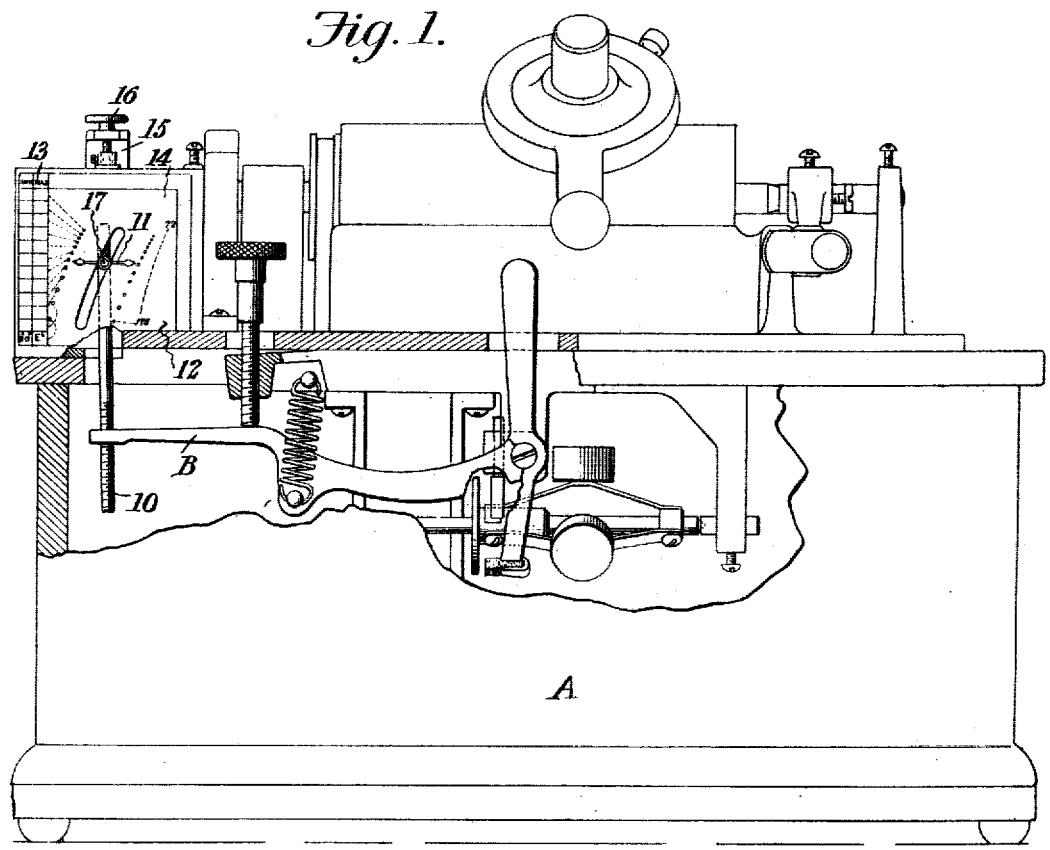
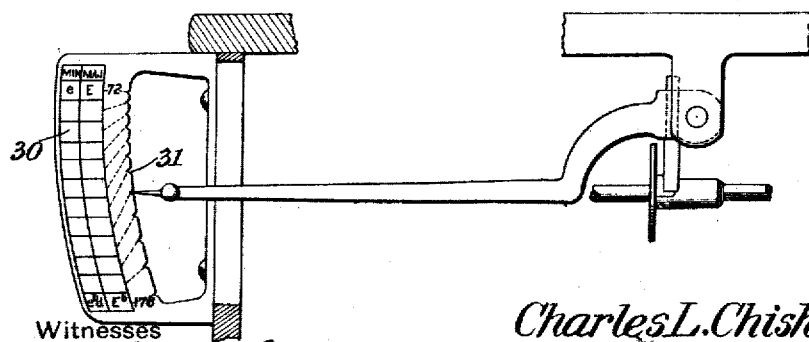

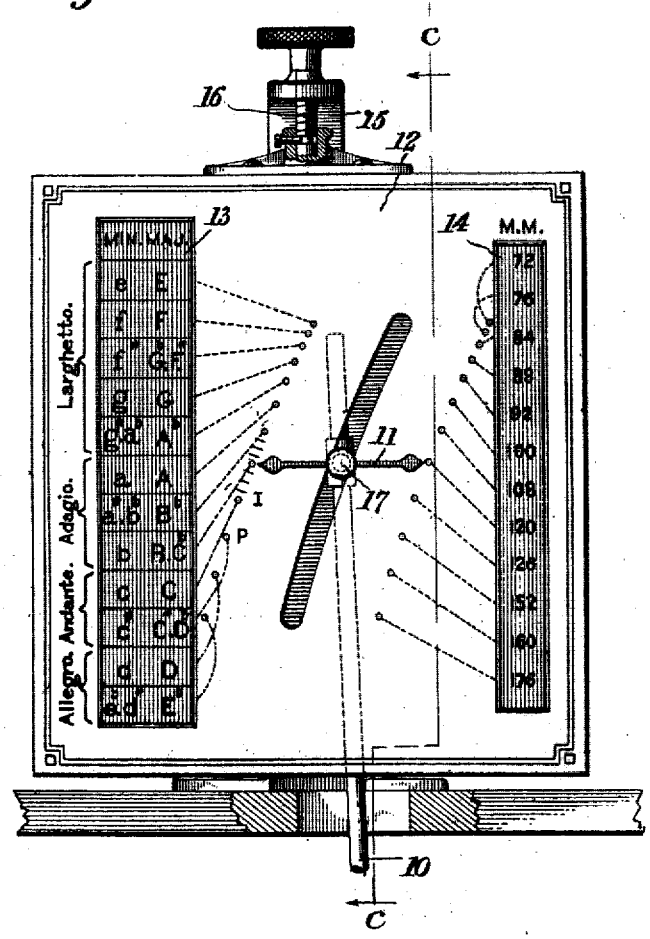
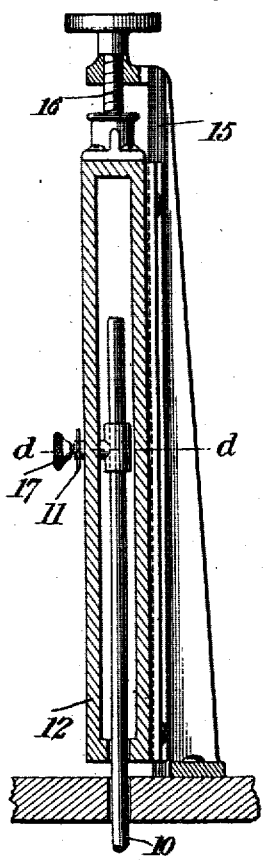
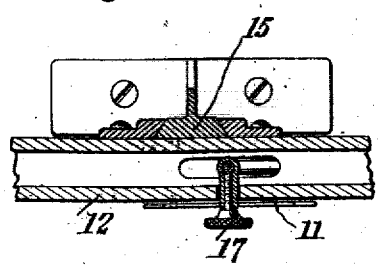

No. 814,941. PATENTED MAR. 13, 1906.
C. L. CHISHOLM.
PITCH INDICATING ATTACHMENT FOR SOUND REPRODUCING MACHINES.
APPLICATION FILED AUG. 8, 1905.
6 SHEETS—SHEET 3.

Charles L. Chisholm, Inventor

Witnesses by

Attorneys

No. 814,941. PATENTED MAR. 13, 1906.
C. L. CHISHOLM.
PITCH INDICATING ATTACHMENT FOR SOUND REPRODUCING MACHINES.
APPLICATION FILED AUG. 8, 1905.

Witnesses

Charles L. Chisholm, Inventor

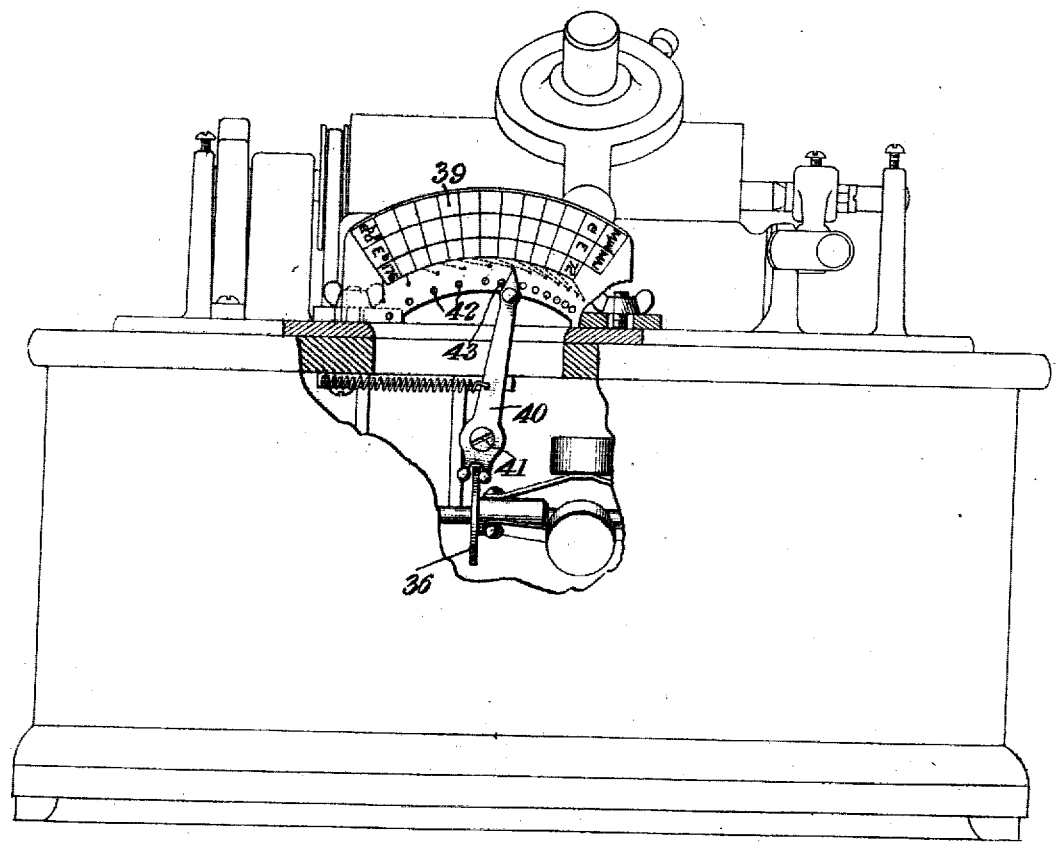

UNITED STATES PATENT OFFICE.

CHARLES L. CHISHOLM, OF NORTH SYDNEY, CANADA.

PITCH-INDICATING ATTACHMENT FOR SOUND-REPRODUCING MACHINES.

No. 814,941.　　　　Specification of Letters Patent.　　Patented March 13, 1906.

Application filed August 8, 1905. Serial No. 273,266.

*To all whom it may concern:*

Be it known that I, CHARLES L. CHISHOLM, a subject of the King of Great Britain, residing at North Sydney, Cape Breton, Canada, have invented a new and useful Pitch-Indicating Attachment for Sound-Reproducing Machines, of which the following is a specification.

The principal object of the present invention is to provide an improved means whereby phonographs, graphophones, and other sound-reproducing machines may be utilized in the teaching of music, and particularly in teaching absolute pitch.

A further object of the invention is to provide an improved form of indicating device in the nature of an attachment which may be made and sold as a separate article of manufacture and applied to existing sound-reproducing machines or which may be constructed as part of a machine during the manufacture of the latter.

A still further object of the invention is to provide for the adjustment of the indicating means in accordance with the pitch and tempo at which a record is made, so that in reproducing the record the speed of the machine may be adjusted until the selection is being reproduced at the pitch and tempo of recording, after which the indicating means may be adjusted until the key-symbol of reproduction is in correct position. The speed of the machine may then be increased or diminished, each movement effecting a simultaneous adjustment of the indicator and the latter showing the new key of reproduction, it being possible to produce any composition in every possible key in true relation to the tonal center and to indicate the correct key of reproduction, so that the pupil may readily follow the selection on the charts previously referred to, a separate chart being prepared for each key.

With these and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

Figure 9:
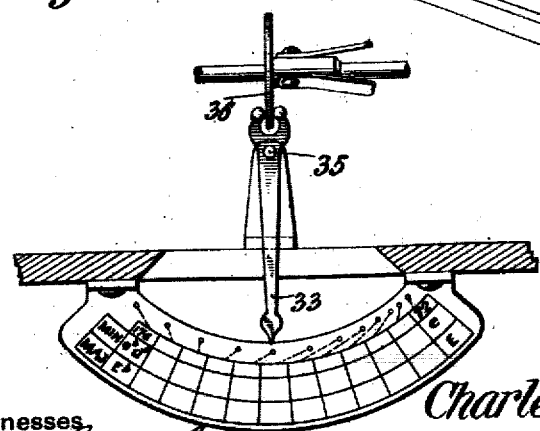
Figure 6:
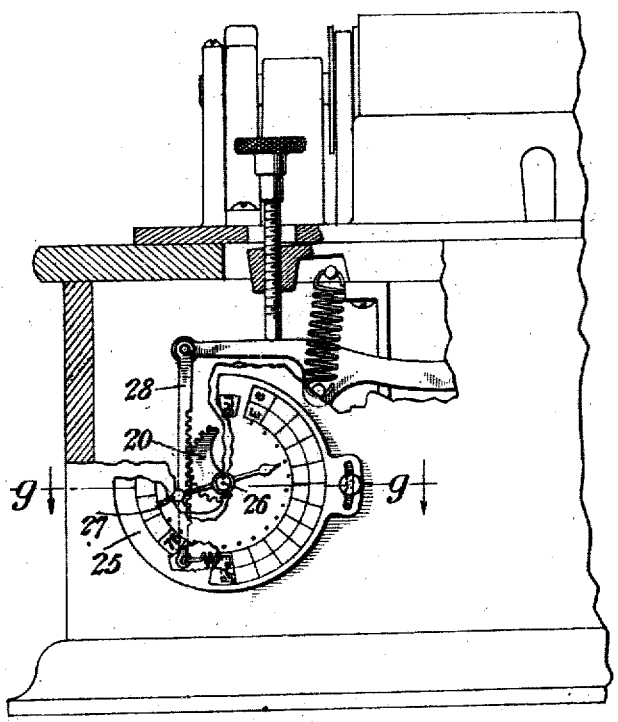
Figure 7:
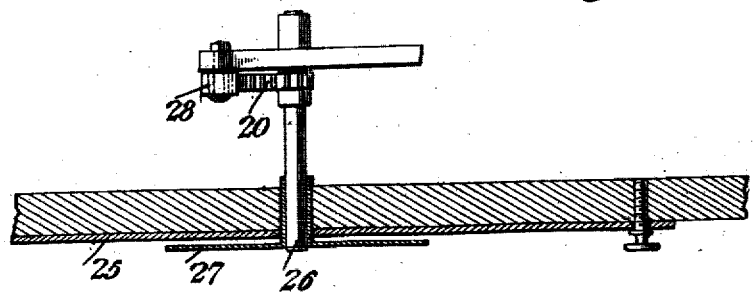

In the accompanying drawings, Figure 1 is a front elevation illustrating a portion of a phonograph and showing the application thereto of an indicating device constructed and arranged in accordance with the invention. Fig. 2 is a detail elevation of the indicating devices on an enlarged scale. Fig. 3 is a vertical section of the same on the line *c c* of Fig. 2. Fig. 4 is a sectional plan view on the line *d d* of Fig. 3. Fig. 5 is a detail perspective view illustrating the application of the device to a gramophone. Fig. 6 is an elevation illustrating a modification of the mechanism, the indicating-dial in this instance being circular in form. Fig. 7 is a sectional view of the same on the line *g g* of Fig. 6. Fig. 8 illustrates a modification of the invention in which the controlling-lever moves directly over an indicating-table. Fig. 9 illustrates a still further modification in which the indicating mechanism is operated directly from the motor. Fig. 10 illustrates a still further modification of the invention.

Similar characters of reference are employed to indicate corresponding parts throughout the several figures of the drawings.

It is well known that in sound-reproducing machines the alteration of the speed of movement of the record will change the pitch and tempo of reproduction, and in practically all machines now on the market means are provided for controlling the speed of the record-carrier so that the operator may adjust the speed in accordance with the speed at which the record was originally made. This, however, is a matter of considerable difficulty, specially for the untrained ear, and it has been proposed to remedy this difficulty by marking on each record the speed of recording and to employ on each reproducing-machine a speed-indicator which may be adjusted in accordance with the speed marked on the record before the reproduction is made. The present invention is not intended merely for the purpose of insuring a correct reproduction in the pitch and tempo at which each selection is recorded, no matter how vital it may be to the correct interpretation of that record's composition, but is intended to first locate a tonal center from which to gravitate to both extremes of the instrument's compass and for permitting reproduction of the composition in every possible key at absolute concert-pitch in every instance.

In the drawings, A designates a portion of a sound-reproducing machine of any desired type, said machine having a speed-controlling device, including a movable member B. To this movable member is secured a rod 10, carrying a double pointer 11, that is movable over a suitable dial or table 12, having two parallel rows of graduations 13 and 14. The graduations 13 are distinguishably designated by the symbols used in musical notation, starting in the present instance from E♭, and the second line of graduations 14 is provided with numerals indicating the metronome-tempo, according to Maelzel. It is preferred also to employ two series of key-notes arranged side by side, one in the major and the other in the minor scale, representing all key-signatures.

The dial or table is carried, in the construction shown in Figs. 1 and 2, by a vertically-arranged standard 15, having an adjusting-screw 16, by means of which the dial or table may be adjusted in accordance with any given position of the pointer, as will hereinafter appear; but the same result may be accomplished by making the pointer adjustable on its carrying-rod and providing a set-screw 17 for locking said pointer after adjustment or in case of a revoluble pointer moving over a circular dial. Either the dial or the pointer may be made adjustable. Before describing further the adjustability of the dial or table, which in some instances is unnecessary, it may be assumed that all records are originally made on a machine rotating at a given speed—such a speed, for instance, as would indicate middle C on the dial or table, this being the international concert-pitch for modern music, whether vocal or instrumental. The record so made is delivered to the pupil, who is provided with a machine having the same indicating mechanism and preferably of precisely the same construction as the recording-machine or in the case of a gramophone arranged for a given speed of reproduction to a known speed of recording. The pupil having first adjusted his speed-regulating mechanism until the pointer is in alinement with the symbol "C," places the record on the carrier and starts the machine. The reproduction which follows is in the pitch and time at which the record was made, and being in absolute concert-pitch the pupil may follow the sound reproduction on a specially-prepared chart written in the key of C, and thus become familiar through constant repetition with the notation and expression. The pupil is provided with fifteen different charts each having a different key-signature in accordance with the symbols on the dial or table, and the composition may be reproduced by means of one record in absolute pitch in any key by adjusting the speed-regulator until the pointer is opposite a symbol representing the desired key. In this manner absolute pitch may be taught the pupil in the most thorough manner, and the device thus become of the utmost value and importance to persons remote from musical centers. With a device of this character the musical possibilities of key relationship, including the enharmonic changes of key, may be fully illustrated, all changes agreeing with standard concert-pitch, and, further, every key is indicated by the pointer on the dial, and at the same time the pointer indicates the metronome-tempo of that key, thereby fixing a standard of time measurement for each individual key. The table or dial is arranged in accordance with the effect produced from the varying speed of the machine to represent the absolute pitch of any chromatic interval. The key-note is fixed in all changes regardless of time, and thus insures correct intonation from any fixed center, in the present instance middle C, at standard concert-pitch. As a further example of the advantages to be gained from an attachment of this character it may be desired, for example, to record a hymn in G and for the machine to lead a choir or chorus through some famous voice. If during recording with the pointer opposite "G" of the dial or table the rendition is too slow, the speed-controlling mechanism is adjusted until the pointer is opposite "D♭" or any key higher than G that will give the best tempo, then record in G with the pointer opposite "D♭," and the hymn will be reproduced at absolute pitch in G. This record could be reproduced on any machine at a distant point in G, standard concert-pitch, and the choir and organ scores could be read in the original key—i. e., G—and at original tempo of recording, the record bearing on the margin the key and metronome figures of speed at recording—i. e., "G–152."

If the indicating mechanism is placed on machines of precisely the same construction and all records are made at precisely the same speed, there is no necessity for adjustment for different speeds. It is usual, however, to regulate the speed of recording in accordance with the length of the selection, so that for a long selection the record will be moved at a slow speed and for a short selection the record will be moved at a high speed, the object in both cases being to secure a record which extends practically from end to end of the cylinder or from the periphery to a given point near the center of a disk record of the gramophone type. The machines also vary in size, and from imperfections in the spring or other motor, wear of the parts, or accumulations of dust in the driving devices the speed of machines of the same make, adjusted in precisely the same manner, will vary to a considerable extent. To overcome this objection, which is a practical difficulty naturally found where the attachment is designed for use in connection with different makes of machines, it is desirable to provide means for adjusting either the dial or the pointer in order that a preliminary adjustment of a given tonal center may first be secured, a tuning-fork being generally employed to assist in this adjustment. The necessary adjustment may be secured by turning the screw 16 in one direction or the other to raise or lower the table, or by loosening the set-screw 17 the pointer may be adjusted and then locked in proper position. The proper adjustment having been secured in absolute pitch, the variations both below and above the tonal center C may then be secured in the manner previously described and the record reproduced in all keys with the same regard to concert-pitch at each change of key.

In the construction shown in Fig. 5 the device is shown as applied to the gramophone type of sound-reproducing machines. In this case the table or dial is supported by a suitable bracket 24 and the operating arm or lever of the speed-controller is extended through a slot in the casing of the machine.

In Fig. 6 is illustrated a further modification of the dial and indicating mechanism. In this case the dial 25 is circular in form and is provided with equidistant graduations bearing the key-symbols. At the center of the dial is an arbor 26, on which is mounted a hand or pointer 20, and at the rear end of the arbor, which extends through the casing of the machine, is secured a cam-shaped gear 27, with which engages a rack 28, carried by the speed-controlling lever of the machine. As the speed-controlling lever is moved up and down the movement is transmitted through the rack and gear to the pointer, and the latter in revolving will correctly indicate the pitch of reproduction. By employing the cam-shaped gear all of the graduations on the dial may be made equidistant as distinguished from the graduations on the dial shown in Fig. 2. In the latter case it is necessary to make the graduations smaller as the speed of the machine is reduced, for the reason that slight variations in reduction of the speed result in considerable variation in pitch, while for increase in speed a greater movement of the lever is necessary to effect corresponding variations in pitch. By the employment of the gearing shown this variation in movement may be compensated for and the graduations may be uniform. In the construction shown in Fig. 6 the dial is circumferentially adjustable in order to secure the adjustment of the tonal center previously described, and the pointer is held by friction on its arbor, so that said pointer may also be adjusted.

In Fig. 8 is illustrated a further modification wherein the dial or table is in the form of a segmental bar or strip 30, bearing graduations and provided with the key-indicating symbols. In alinement with each graduation is a notch 31, and the several notches are designed to receive the end of the speed-controlling member, the latter being sprung into any one or other of the notches and being manipulated by hand in order to control the speed, thus dispensing with the screw-adjustment and permitting more ready changing of the speed of the instrument.

In Fig. 9 is illustrated a further modification wherein the pitch-indicating device is operated directly from the motor instead of from the speed-adjusting device. In this case the dial or table is arranged at a slight angle to the horizontal and disposed in front of the machine. Over the table travels a pointer 33, mounted on a pivot-pin 35 and bifurcated at its rear end in order to embrace a disk 36, that is moved to and fro with the governor as the speed of the machine varies. This longitudinal movement of the disk on the governor-shaft serves to move the pointer and correctly indicate the pitch of reproduction.

In Fig. 10 is illustrated a still further modification of the invention. In this instance the disk 36 is engaged by the lower end of a vertically-disposed lever 40, pivoted on a pin 41, that is carried by the hinged cover of the casing. The upper end of this lever is adapted to travel over a dial 39, bearing the pitch-indicating symbols. The dial in this instance is in the form of a bar having openings 42 arranged at the different graduations. These openings are arranged for the reception of a stop-pin 43, which may be adjusted into any one of the openings in order to form a stop for the lever, and by moving said lever until its upper end is opposite any one of the graduations the disk may be adjusted to control the operation of the machine at the speed desired. Movement of the upper end of the lever to the extreme right will by friction on the disk 36 cause the complete stoppage of the motor, so that the lever acts as a stopping, starting, speed controlling and indicating means.

It is obvious that the indicating means may be operated from any part of the machine and connected to any of the movable parts thereof without departing from the invention.

Having thus described the invention, what is claimed is—

1. In apparatus of the class described, a table bearing in parallel columns the pitch-indicating symbols of musical notation, a metronome time-indicating scale, a double pointer movable between said columns to indicate the pitch and tempo of reproduction, and a speed-controlling mechanism connected to said pointer.

2. In apparatus of the class described, a dial or table bearing pitch-indicating symbols, and a metronome time-indicating scale, the face of said table being provided with a slot, a standard, an adjusting-screw carried by the standard and forming a suspension means for said table, a double pointer, a pointer-support extending through the slot, a rod carrying the pointer-support, and means connecting said rod to the speed-controlling mechanism of the machine.

3. In apparatus of the class described, a table for indicating the different keys in which a reproduction is made, said table being adjustable to the end that a given graduation of the table will correspond to the pitch or key in which the record is made, and means connected to the speed-controlling mechanism for indicating on said table the absolute pitch of reproduction both above and below the pitch of recording.

4. An indicating attachment for a phonograph or like machine, having a speed-controlling mechanism, said indicating means comprising a table or dial having graduations designated by the characters employed in musical notation, a pointer movable over the table and under the control of the speed-controlling mechanism, and a means for effecting adjustment of the table with relation to the pointer, whereby said table may be adjusted in accordance with the pitch and tempo of the reproduction.

In testimony that I claim the foregoing as my own I have hereto affixed my signature in the presence of two witnesses.

CHARLES L. CHISHOLM.

Witnesses:
J. H. JOCHUM, Jr..
M. O. AUERBACH.